United States Patent [19]

Moore

[11] Patent Number: 6,003,615
[45] Date of Patent: Dec. 21, 1999

[54] STACKING TOOL BAR INCLUDING A WING FLEX STRUCTURE

[76] Inventor: Paul O. Moore, P.O. Box 105, Benedict, Nebr. 68316

[21] Appl. No.: 09/136,851

[22] Filed: Aug. 19, 1998

[51] Int. Cl.$^6$ ................................................. A01B 63/00
[52] U.S. Cl. ........................ 172/456; 172/311; 172/662
[58] Field of Search .................................... 172/456, 451, 172/457, 458, 459, 460, 311, 310, 662, 634, 635, 636, 637, 639, 640; 111/52, 1, 57

[56] References Cited

U.S. PATENT DOCUMENTS

| | | | |
|---|---|---|---|
| 3,463,241 | 8/1969 | Essex | 172/311 |
| 4,046,203 | 9/1977 | Ward | 172/456 |
| 4,116,282 | 9/1978 | Hansen | 172/311 |
| 4,126,189 | 11/1978 | Channel | 172/456 |
| 4,204,575 | 5/1980 | Richardson et al. | 172/311 X |
| 4,206,815 | 6/1980 | Hatcher | 172/311 |
| 4,271,711 | 6/1981 | Vavra | 74/96 |
| 4,342,367 | 8/1982 | Gates | 172/776 |
| 4,400,994 | 8/1983 | Skjaeveland | 74/520 |
| 4,529,040 | 7/1985 | Grollimund | 172/311 |
| 4,561,505 | 12/1985 | Williamson | 172/776 |
| 4,660,654 | 4/1987 | Wiebe et al. | 172/776 |
| 4,862,758 | 9/1989 | Magee | 74/103 |
| 5,429,195 | 7/1995 | Turnis | 172/311 |
| 5,540,290 | 7/1996 | Peterson et al. | 172/311 |
| 5,577,563 | 11/1996 | Holen | 172/456 |
| 5,740,870 | 4/1998 | Rodgers et al. | 172/456 |
| 5,921,325 | 7/1999 | Meek et al. | 172/311 |

*Primary Examiner*—Victor Batson
*Attorney, Agent, or Firm*—Zarley, McKee, Thomte Voorhees & Sease; Dennis L. Thomte

[57] ABSTRACT

A stacking tool bar including a wing flex structure is disclosed which includes a main tool bar section having right and left wing sections positioned at the outer ends thereof. Hydraulically operated lift arms are operatively connected to the wing sections for pivotally moving the wing sections from a field working position to a transport position. Double-acting flex cylinders are provided for dampening the upward and downward movement of the outer ends of the wing sections as the tool bar is pulled through the field. The double-acting flex cylinders also enable the wing sections to be disposed in a horizontally disposed condition when the wing sections have been pivotally moved upwardly to their folded and stacked position.

10 Claims, 5 Drawing Sheets

STACKING TOOL BAR INCLUDING A WING FLEX STRUCTURE

BACKGROUND OF THE INVENTION

1. Field of the Invention

This invention relates to a stacking tool bar and more particularly to a stacking tool bar which includes means for enabling the wings of the tool bar to flex upwardly and downwardly as the tool bar is being pulled through a field and which also includes means for leveling the wing sections of the tool bar when the tool bar is in its folded and stacked condition.

2. Description of the Related Art

Many types of tool bars have been previously provided for supporting various agricultural implements behind a tractor in order to plant, cultivate, etc. As the tool bars have increased in length due to the fact that tractors are much larger than in previous years, it has been necessary to fold the tool bars from their field working positions to their transport positions so that they may be pulled on a road from one field to another. To overcome the problems of the prior art, stack-folding tool bars have been developed to support the various planters, etc., in an upright position when the tool bars are folded to their transport position. In many cases, when the tool bars are folded and stacked, the wing sections of the tool bars are not horizontally disposed. Yet another problem associated with the long tool bars heretofore available is that the wing sections of the tool bar were not able to properly flex to compensate for various ground irregularities.

SUMMARY OF THE INVENTION

A stacking tool bar including a wing flex structure is disclosed comprising an elongated main tool bar section having right and left ends; an elongated right tool bar wing section positioned at the right end of the main tool bar section; an elongated left tool bar wing section positioned at the left end of the section; an elongated frame member positioned above the main tool bar section having its right and left ends positioned inwardly of the right and left ends of the main tool bar section, respectively; a first lift arm pivotally secured at its inner end to the right end of the elongated frame member; a second lift arm pivotally secured at its inner end to the left end of the elongated frame member; a first lift cylinder pivoted at its base end to the right end of the elongated frame member and having its rod end pivoted to the first lift arm; a second lift cylinder pivoted at its base end to the left end of the elongated frame member and having its rod end pivoted to the second lift arm; first and second brackets secured to the inner ends of the right and left tool bar wing sections, respectively; the outer ends of the first and second lift arms being pivotally secured to the first and second brackets, respectively; first and second pivot brackets having their lower ends pivotally secured to the upper ends of the first and second brackets, respectively; first and second flex cylinders having their base ends pivotally secured to the first and second brackets, respectively; the rod ends of the first and second flex cylinders being pivotally secured to the outer ends of the first and second pivot brackets, respectively; a first elongated support member pivotally secured at its inner end to the first elongated member and pivotally secured at its outer end to the inner end of the first pivot bracket; a second support member pivotally secured at its inner end to the first elongated frame member and being pivotally secured at its outer end to the inner end of the second pivot bracket.

When the tool bar is in its field position, the first and second flex cylinders permit the outer ends of the right and left tool bar wing sections to flex or move upwardly and downwardly to compensate for variations in the ground surface of the field. When the tool bar is in its folded and stacked position, the flex cylinders may be operated to position the wing sections in a horizontally disposed position.

It is therefore a principal object of the invention to provide an improved stacking tool bar.

Still another object of the invention is to provide a stacking tool bar including a wing flex structure.

Still another object of the invention is to provide a stacking tool bar including a wing flex structure which enables the outer ends of the wing sections to move upwardly and downwardly according to the ground surface passing beneath the wing sections.

Still another object of the invention is to provide a stacking tool bar including means for moving the wing sections of the tool bar to a horizontally disposed position when the tool bar is in its stacked condition.

These and other objects will be obvious to those skilled in the art.

DESCRIPTION OF THE PREFERRED EMBODIMENT

Figure 1:
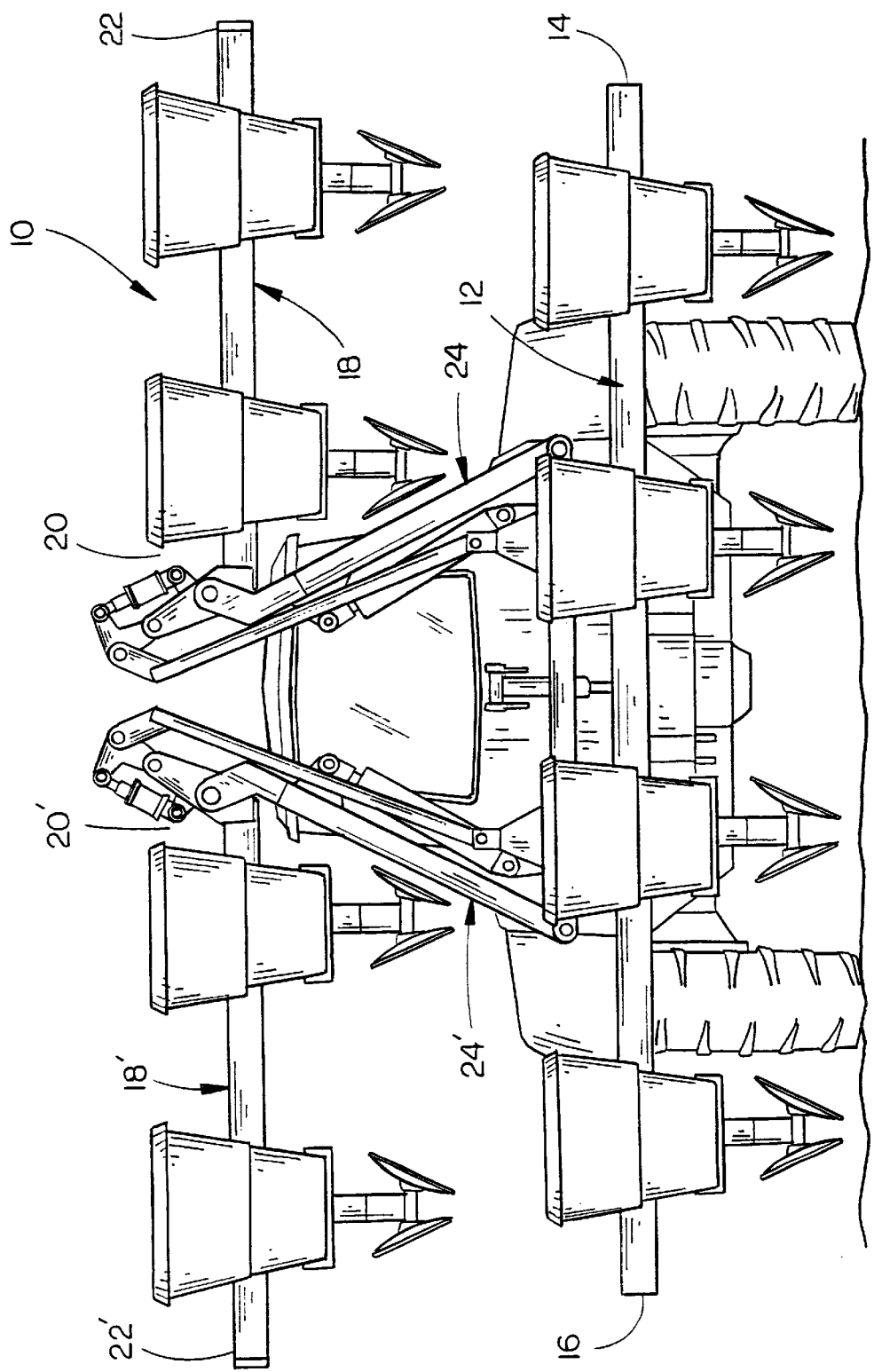
FIG. 1 is a rear view of the stacking tool bar of this invention mounted on a tractor with the tool bar being in its transport position.

The stacking tool bar of this invention is referred to generally by the reference numeral 10 and includes an elongated main tool bar section 12 having a right end 14 and a left end 16 as viewed from the rear of the tool bar. Preferably, main tool bar section 12 is constructed of a pair of seven inch by seven inch square tubular members 12A and 12B, although the dimension of the same may be varied according to the particular needs of the particular tool bar. The numeral 18 refers to a right tool bar wing section having an inner end 20 and an outer end 22. Preferably, wing section 18 is also constructed of a seven inch by seven inch steel tubular member, but those dimensions will vary. The numeral 18' refers to an elongated left tool bar wing section having an inner end 20' and an outer end 22'.

The numeral 24 refers generally to an assembly for raising and lowering wing section 18 as well as for flexing the same, which will be described in detail hereinafter.

The numeral 24' refers to an assembly which is identical to assembly 24, but which is used to stack and flex the left wing section 18'. Inasmuch as assemblies 24 and 24' are identical, only assembly 24 will be described in detail with "'" indicating identical structure on assembly 24'.

An elongated frame member 26 is secured to main tool bar section 12 by posts 28 and 30 so that frame member 26 is positioned above main tool bar section 12, as illustrated in the drawings. As seen in the drawings, the outer ends of the frame member 26 are positioned inwardly of the right and left ends of the main tool bar section 12.

An elongated lift arm 32 has its inner end pivoted to the right end of frame member 26 at 34 and has its outer end pivoted to and received by a pair of vertically disposed plates 36 and 38 which form a bracket 40. The outer end of lift arm 32 is pivoted to plates 36 and 38 by means of pin 42. The inner end of wing section 18 is received between the plates 36 and 38 adjacent the lower ends thereof and is welded thereto for movement therewith. As seen in the drawings, the lower inner ends of the plates 36 and 38 receive the right end of main tool bar section 12 to aid in stabilizing the assembly when the tool bar is in its field working position.

Lift cylinder 44 has its base end pivotally secured to a bracket 46 which is welded to frame member 26 adjacent the right end thereof. Lift cylinder 44 is pivoted to bracket 46 at 48. The rod 50 of lift cylinder 44 is pivoted to a bracket 52 which is welded to lift arm 32 adjacent the outer end thereof.

An elongated support rod assembly 54 has its inner end pivoted, by pin 55, to bracket 56 which is welded to frame member 26 and which extends upwardly therefrom. The outer end of support rod assembly 54 is pivoted to pivot bracket 58 by pin 60. The lower end of pivot bracket 58 is pivotally secured to the plates 36 and 38 by means of pin 62. The rod 64 of flex cylinder 66 is pivotally secured to the upper outer end of pivot bracket 58 by means of pin 68. The base end of flex cylinder 66 is pivotally secured to bracket 70 which is received between the plates 36 and 38 and is welded thereto. Flex cylinder 66 is of the double-acting type.

The main tool bar section 12 is secured to the tractor or the like by means of a three-point hitch assembly of conventional design. The lift cylinders 44 and as well as the flex cylinders 66 and are operatively connected to the hydraulic system of the tractor. Planters, cultivators, etc., are connected to the tool bar sections in conventional fashion. Further, gauge wheels will be operatively secured to the outer ends of the wing sections 18 and 18' in conventional fashion. As the tractor pulls the implement through the field, the gauge wheels follow the contours of the field. The flex cylinders 66 and 66' act as shock absorbers between the main tool bar section 12 and the wing sections 18 and 18' and permit the wing sections 18 and 18' to move upwardly and downwardly, with respect to the main tool bar section 12, as illustrated by dashed lines in FIG. 2.

Figure 2:
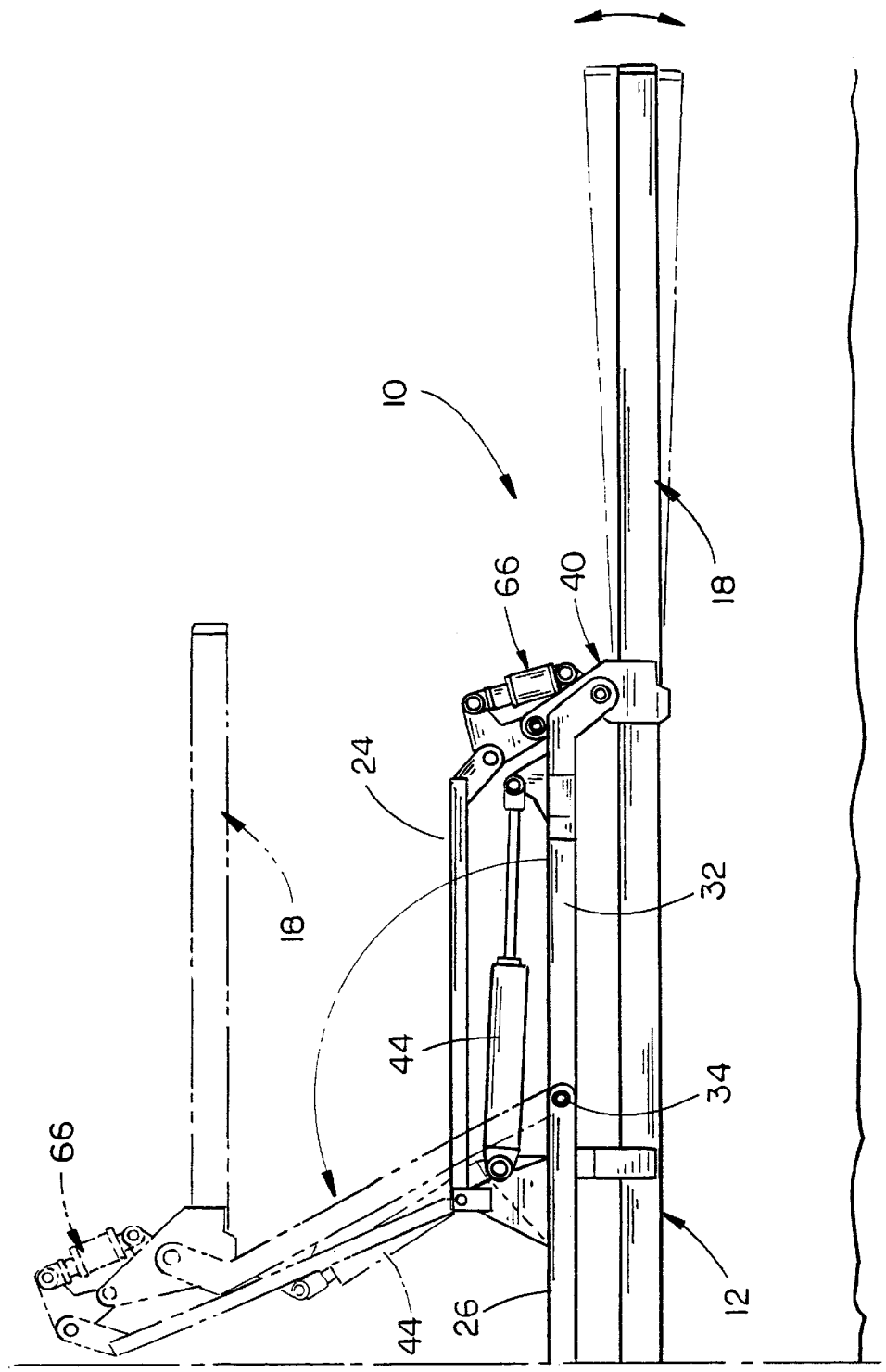
FIG. 2 is a partial rear view of the tool bar of this invention with the broken lines illustrating alternate positions.
Figure 3:
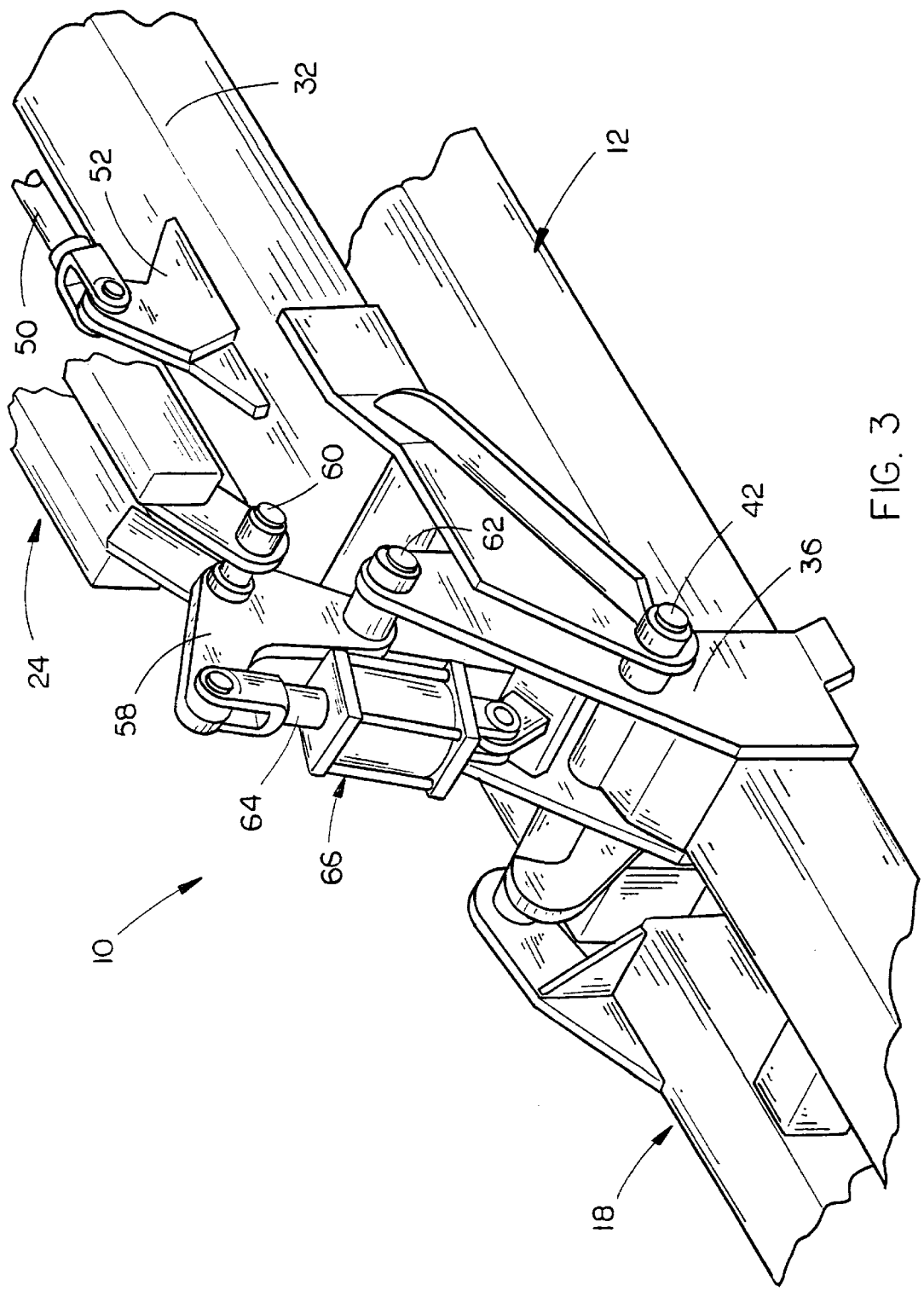
FIG. 3 is a partial perspective view of the invention.
Figure 4:
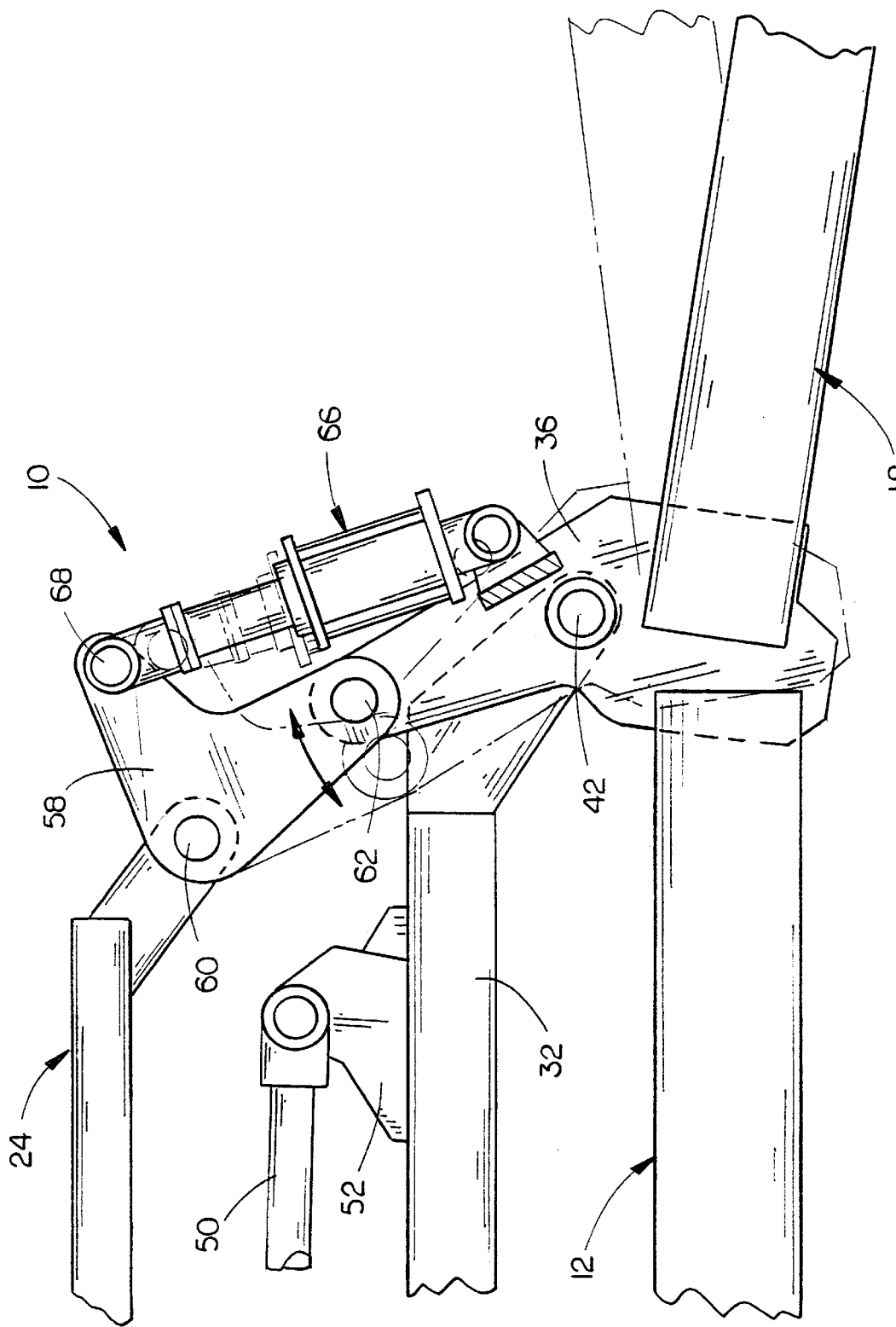
FIG. 4 is a partial end view of the invention.
Figure 5:
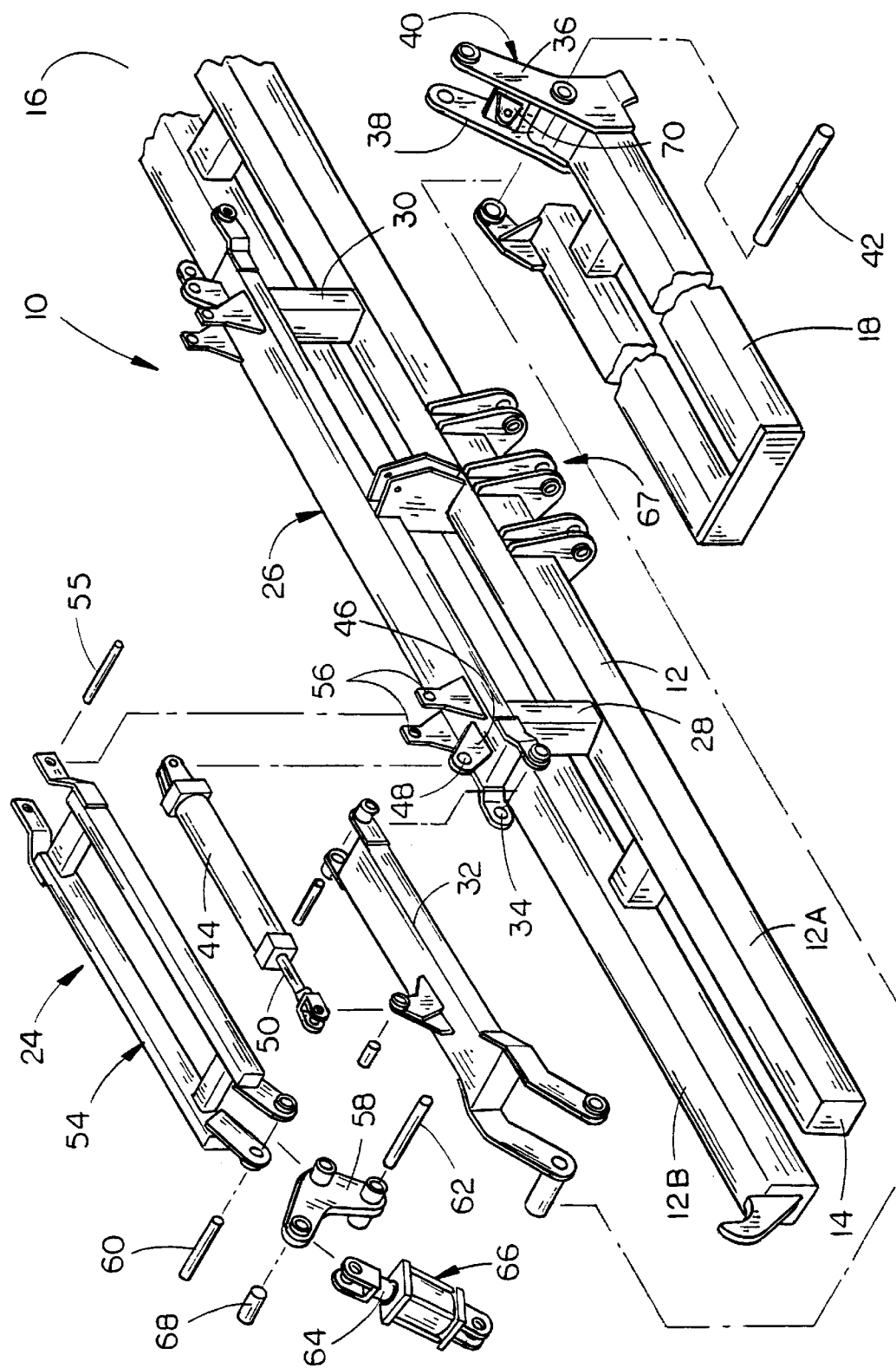
FIG. 5 is a partial exploded perspective view of the invention.

When it is desired to fold and stack the wing sections 18 and 18', and the planter or cultivator units mounted thereon, the lift cylinders 44 and 44' are retracted which causes the wing sections 18 and 18' to pivotally move upwardly from their field working position, shown in solid lines in FIG. 2, to that position illustrated in FIG. 1. As the wing sections 18 and 18' are being pivotally moved upwardly and inwardly from the field working position to the position of FIG. 1, the flex cylinders 66 and 66' are extended to maintain the wing sections 18 and 18' in a substantially horizontally disposed position such as illustrated in FIG. 1.

Thus it can be seen that a novel stacking tool bar has been provided which enables the wing sections to flex upwardly and downwardly with respect to the main tool bar section with that flexing action being dampened by the double action flex cylinders 66 and 66'. Furthermore, the flex cylinders 66 and 66' enable the wing sections 18 and 18' to be properly positioned in a substantially horizontally disposed position for transport.

Thus it can be seen that the invention accomplishes at least all of its stated objectives.

I claim:

1. A stacking tool bar including a wing flex structure, comprising:

an elongated main tool bar section having right and left ends;

an elongated right tool bar wing section having inner and outer ends and positioned at said right end of said main tool bar section;

an elongated left tool bar wing section having inner and outer ends and positioned at said left end of said main tool bar section;

an elongated frame member, having right and left ends, positioned above said main tool bar section and having its right and left ends positioned inwardly of said right and left ends of said main tool bar section, respectively;

a first elongated lift arm, having inner and outer ends, pivotally secured at its said inner end to said right end of said elongated frame member;

a second elongated lift arm, having inner and outer ends, pivotally secured at its said inner end to said left end of said elongated frame member;

a first lift cylinder, having a base end and a rod end, pivoted at its said base end to said right end of said elongated frame member and having its said rod end pivoted to said first lift arm inwardly of the outer end thereof;

a second lift cylinder, having a base end and a rod end, pivoted at its said base end to said left end of said elongated frame member and having its rod end pivoted to said second lift arm inwardly of the outer end thereof;

a first bracket secured to the inner end of said right tool bar wing section and having upper and lower ends;

the outer end of said first lift arm being pivotally secured to said first bracket;

a second bracket secured to the inner end of said left tool bar wing section and having upper and lower ends;

the outer end of said second lift arm being pivotally secured to said second bracket;

a first pivot bracket having upper and lower ends and inner and outer ends;

said lower end of said first pivot bracket being pivotally secured to said upper end of said first bracket;

a first flex cylinder having a base end and a rod end;

said base end of said first flex cylinder being pivotally secured to said first bracket;

said rod end of said first flex cylinder being pivotally secured to said outer end of said first pivot bracket;

a first elongated support member having inner and outer ends;

said first support m emb er being pivotally secured a t its said inner end to said elongated frame member and being pivotally secured at its said outer end to said inner end of said first pivot bracket;

a second pivot bracket having upper and lower ends and inner and outer ends;

said lower end of said second pivot bracket being pivotally secured to said upper end of said second bracket;

a second flex cylinder having a base end and a rod end;

said base end of said second flex cylinder being pivotally secured to said second bracket;

said rod end of said second flex cylinder being pivotally secured to said outer end of said second pivot bracket;

and a second elongated support member having inner and outer ends;

said second support member being pivotally secured at its said inner end to said elongated frame member and being pivotally secured at its said outer end to said inner end of said second pivot bracket.

2. The tool bar of claim 1 wherein each of said first and second flex cylinders are double-acting cylinders.

3. The tool bar of claim 2 wherein said flex cylinders act as shock absorbers for said wing sections.

4. The tool bar of claim 1 wherein said lift cylinders are movable between retracted and extended positions and wherein the retraction of said lift cylinders causes said wing sections to be pivotally raised and moved inwardly with respect to said main tool bar section.

5. The tool bar of claim 4 wherein said flex cylinders are selectively movable between retracted and extended positions and wherein said flex cylinders may be extended, as said lift cylinders are raising said wing sections, to maintain said wing sections in a horizontally disposed condition.

6. A stacking tool bar including a wing flex structure, comprising:

an elongated main tool bar section having right and left ends;

an elongated right tool bar wing section having inner and outer ends and positioned at said right end of said main tool bar section;

an elongated left tool bar wing section having inner and outer ends and positioned at said left end of said main tool bar section;

an elongated frame member, having right and left ends, positioned above said main tool bar section and having its right and left ends positioned inwardly of said right and left ends of said main tool bar section, respectively;

a first elongated lift arm, having inner and outer ends, pivotally secured at its said inner end to said right end of said elongated frame member;

a second elongated lift arm, having inner and outer ends, pivotally secured at its said inner end to said left end of said elongated frame member;

a first lift cylinder, having a base end and a rod end, pivoted at its said base end to said right end of said elongated frame member and having its said rod end pivoted to said first lift arm inwardly of the outer end thereof;

a second lift cylinder, having a base end and a rod end, pivoted at its said base end to said left end of said elongated frame member and having its rod end pivoted to said second lift arm inwardly of the outer end thereof;

a first bracket secured to the inner end of said right tool bar wing section;

the outer end of said first lift arm being pivotally secured to said first bracket;

a second bracket secured to the inner end of said left tool bar wing section;

the outer end of said second lift arm being pivotally secured to said second bracket;

a first pivot bracket;

said first pivot bracket being pivotally secured to said first bracket;

a first flex cylinder having a base end and a rod end;

said base end of said first flex cylinder being pivotally secured to said first bracket;

said rod end of said first flex cylinder being pivotally secured to said first pivot bracket;

a first elongated support member having inner and outer ends;

said first support member being pivotally secured at its said inner end to said elongated frame member and being pivotally secured at its said outer end to said first pivot bracket;

a second pivot bracket;

said second pivot bracket being pivotally secured to said second bracket;

a second flex cylinder having a base end and a rod end;

said base end of said second flex cylinder being pivotally secured to said second bracket;

said rod end of said second flex cylinder being pivotally secured to said second pivot bracket;

and a second elongated support member having inner and outer ends;

said second support member being pivotally secured at its said inner end to said elongated frame member and being pivotally secured at its said outer end to said second pivot bracket.

7. The tool bar of claim 6 wherein each of said first and second flex cylinders are double-acting cylinders.

8. The tool bar of claim 7 wherein said flex cylinders act as shock absorbers for said wing sections.

9. The tool bar of claim 6 wherein said lift cylinders are movable between retracted and extended positions and wherein the retraction of said lift cylinders causes said wing sections to be pivotally raised and moved inwardly with respect to said main tool bar section.

10. The tool bar of claim 9 wherein said flex cylinders are selectively movable between retracted and extended positions and wherein said flex cylinders may be extended, as said lift cylinders are raising said wing sections, to maintain said wing sections in a horizontally disposed condition.

* * * * *